(12) United States Patent
Gonzalez et al.

(10) Patent No.: US 11,797,166 B2
(45) Date of Patent: Oct. 24, 2023

(54) GRAPHICAL USER INTERFACES DEPICTING HISTORICAL PRINTHEAD CONDITIONS

(71) Applicants: Patrick Gonzalez, Boulder, CO (US); Carlie Charp, Boulder, CO (US); Ziling Zhang, Boulder, CO (US)

(72) Inventors: Patrick Gonzalez, Boulder, CO (US); Carlie Charp, Boulder, CO (US); Ziling Zhang, Boulder, CO (US)

(73) Assignee: Ricoh Company, Ltd., Tokyo (JP)

( * ) Notice: Subject to any disclaimer, the term of this patent is extended or adjusted under 35 U.S.C. 154(b) by 0 days.

(21) Appl. No.: 17/577,880

(22) Filed: Jan. 18, 2022

(65) Prior Publication Data

US 2023/0229294 A1    Jul. 20, 2023

(51) Int. Cl.
*G06F 3/04847* (2022.01)
(52) U.S. Cl.
CPC .............................. *G06F 3/04847* (2013.01)
(58) Field of Classification Search
CPC .................................................. G06F 3/04847
See application file for complete search history.

(56) References Cited

U.S. PATENT DOCUMENTS

| | | | |
|---|---|---|---|
| 8,806,361 B1* | 8/2014 | Noel | G06F 3/0481 715/771 |
| 9,016,819 B2 | 4/2015 | Ono | |
| 9,145,020 B2 | 9/2015 | Cupit | |
| 9,415,600 B2 | 8/2016 | Derleth et al. | |
| 2008/0174622 A1* | 7/2008 | Carlson | B41J 2/2139 347/12 |

(Continued)

FOREIGN PATENT DOCUMENTS

| | | |
|---|---|---|
| JP | 5169511 B2 | 3/2013 |
| KR | 101208453 B1 | 12/2012 |

(Continued)

OTHER PUBLICATIONS

Kye-Si Kwon et al; Sensors and Actuators A: Physical; Elsevier 2012.

(Continued)

*Primary Examiner* — Jennifer N Welch
*Assistant Examiner* — Reji Kartholy
(74) *Attorney, Agent, or Firm* — Duft & Bornsen, PC

(57) ABSTRACT

Systems and methods are provided for reporting printhead conditions. One embodiment is a system that includes a user interface, a display, and a controller configured to present a Graphical User Interface (GUI) via the display. The GUI includes a first area depicting an array of printheads. Each printhead of the array is represented by a first visual indicator that signifies a frequency of printhead conditions detected at that printhead over a period of time. In response to receiving a selection of at least one of the printheads via the user interface, the controller presents a second area of the GUI via the display. The second area depicts locations of printhead conditions detected at the selection over the period of time. Each of the locations is represented by a second visual indicator that signifies a frequency of printhead conditions detected at that location over the period of time.

20 Claims, 10 Drawing Sheets

(56) References Cited

U.S. PATENT DOCUMENTS

| | | | | |
|---|---|---|---|---|
| 2014/0074850 A1* | 3/2014 | Noel | ................... | G06N 5/022 |
| | | | | 707/741 |
| 2016/0098234 A1* | 4/2016 | Weaver | ................ | G06F 3/121 |
| | | | | 358/1.15 |
| 2019/0102270 A1* | 4/2019 | Dennison | ............. | G06F 3/121 |
| 2022/0261303 A1* | 8/2022 | Weaver | ............. | G06F 3/1234 |

FOREIGN PATENT DOCUMENTS

| | | | |
|---|---|---|---|
| KR | 20180128609 A | * | 12/2018 |
| WO | 2018185515 A1 | | 10/2018 |
| WO | 2020239820 A1 | | 12/2020 |

OTHER PUBLICATIONS

U.S. Appl. No. 16/712,985.
U.S. Appl. No. 17/195,110.

\* cited by examiner

_ GRAPHICAL USER INTERFACES DEPICTING HISTORICAL PRINTHEAD CONDITIONS

TECHNICAL FIELD

The following disclosure relates to the field of printing, and in particular, to inspection of printed content.

BACKGROUND

Entities with substantial printing demands typically use a production printer. A production printer is a high-speed printer used for volume printing, such as a continuous-forms printer that prints on a web of print media stored on a large roll. A production printer typically includes a localized print controller that manages the overall operation of the printer, and a marking engine (sometimes referred to as an "imaging engine" or a "print engine"). The marking engine includes one or more arrays of printheads.

Upon receiving a print job, the print controller rasterizes logical pages of the job (e.g., to create bitmaps representing each page of the job), and the marking engine operates individual printheads to mark the web based on the rasterized logical pages. Thus, the printer marks physical pages based on the digital information of the print job.

In order to ensure that a print job has been printed at a desired level of quality, it is not uncommon for the output of a print job to be scanned. For example, a system may scan test patterns printed onto pages of a print job, in order to detect printhead conditions such as jetouts. Some printhead conditions may be correctable via the flushing of ink at a printhead. However, as a printhead reaches the end of its usable life, it may encounter printhead conditions more often than new printheads, resulting in a need for additional maintenance.

Thus, those who operate print shops continue to seek out enhanced systems and methods that enable the output of printheads to be monitored in a manner that facilitates efficient operation of the print shop.

SUMMARY

Embodiments described herein provide for enhanced print review systems which generate Graphical User Interfaces (GUIs) indicating the historical prevalence of printhead conditions at specific printheads, at groups of nozzles within a printhead, and/or at individual nozzles within a printhead. These GUIs help technicians at a print shop to identify printheads (and/or portions thereof) that are prone to repeated problems in need of correction. If a printhead is subject to more problems than expected over time, it may be replaced to resolve the issue.

These processes and systems provide a technical benefit because they allow for printheads to be replaced when they start to become demonstrably unreliable, rather than simply being replaced on a time-based schedule. Hence, efficiency is enhanced at the print shop because printheads for printers are capable of being replaced before they develop a need for constant cleaning which would waste ink, time, and other resources. Furthermore, the frequency of replacement components at the print shop can be beneficially adjusted to an as-needed basis, because printheads can be maintained at a printer for as long as they remain viable.

One embodiment is a system that includes a user interface, a display, and a controller configured to present a Graphical User Interface (GUI) via the display. The GUI includes a first area depicting an array of printheads. Each printhead of the array is represented by a first visual indicator that signifies a frequency of printhead conditions detected at that printhead over a period of time. In response to receiving a selection of at least one of the printheads via the user interface, the controller presents a second area of the GUI via the display. The second area depicts locations of printhead conditions detected at the selection over the period of time. Each of the locations is represented by a second visual indicator that signifies a frequency of printhead conditions detected at that location over the period of time.

A further embodiment is a method. The method includes presenting a Graphical User Interface (GUI) via a display, the GUI including a first area depicting an array of printheads, wherein each printhead of the array is represented by a first visual indicator that signifies a frequency of printhead conditions detected at that printhead over a period of time, receiving a selection of at least one of the printheads, and presenting a second area of the GUI via the display, the second area depicting locations of printhead conditions detected at the selection over the period of time, wherein each of the locations is represented by a second visual indicator that signifies a frequency of printhead conditions detected at that location over the period of time.

A further embodiment is a non-transitory computer readable medium embodying programmed instructions which, when executed by a processor, are operable for performing a method. The method includes presenting a Graphical User Interface (GUI) via a display, the GUI including a first area depicting an array of printheads, wherein each printhead of the array is represented by a first visual indicator that signifies a frequency of printhead conditions detected at that printhead over a period of time, receiving a selection of at least one of the printheads, and presenting a second area of the GUI via the display, the second area depicting locations of printhead conditions detected at the selection over the period of time, wherein each of the locations is represented by a second visual indicator that signifies a frequency of printhead conditions detected at that location over the period of time.

Other illustrative embodiments (e.g., methods and computer-readable media relating to the foregoing embodiments) may be described below.

DESCRIPTION OF THE DRAWINGS

Some embodiments of the present invention are now described, by way of example only, and with reference to the accompanying drawings. The same reference number represents the same element or the same type of element on all drawings.

DETAILED DESCRIPTION

The figures and the following description illustrate specific illustrative embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
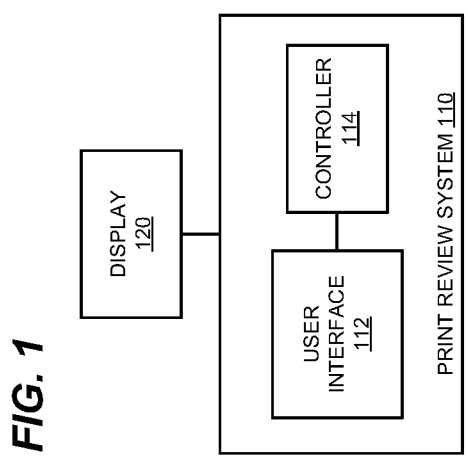
FIG. 1 is a block diagram of a print review system in an illustrative embodiment.

FIG. 1 is a block diagram of a print review system 110. Print review system 110 comprises any device capable of imaging and/or reviewing the printed output of a printer in order to detect printhead conditions. Printhead conditions comprise any physical, electrical, or firmware status relating to a printhead, or portion thereof, which has an impact on the ability of the printhead to eject ink onto print media in accordance with supplied instructions. Examples of printhead conditions include "jetout," "deviated jet," "delamination," and others.

Print review system 110 has been enhanced to maintain information describing the number and/or type of printhead conditions detected for each printhead and/or nozzle of a printer over a historical period of time that encompasses multiple days (e.g., a month or more), print jobs, and/or calibration routines. Print review system 110 then presents this historical information describing printhead conditions at a GUI (e.g., via a heatmap), enabling a technician to rapidly detect printheads, and/or locations at printheads, that have been historically unreliable.

While the print review system 110 may perform an inspection of any kind of printed content in order to detect printhead conditions, it may be particularly beneficial for the print review system 110 to inspect flush pages and/or flush lines generated by the printer, because these portions of the page are specifically designed to facilitate the detection of printhead conditions. Printers perform flushing by periodically instructing their printheads to eject ink. This operation prevents individual nozzles of the printhead from clogging due to ink drying out near the nozzles. Flush lines, which are produced via a technique known as line flushing, are created by instructing the nozzles of a printhead to eject ink as printed lines across the width of the printed page. For example, this may be performed at the top or bottom of one or more printed pages (e.g., each printed page, every N printed pages, etc.) for a print job. Flush pages (also known as "flushing pages" or "quality check pages"), comprise additional pages that are periodically inserted into the print stream during printing. Flush pages may be used for flushing (e.g., line flushing) and/or to receive other quality check markings. The manner in which the nozzles for a printhead eject ink for a flush line may differ from that used for flush pages, but in either case, the presence of printhead conditions is often easier to detect than on other forms of printed content.

During inspection, controller 114 of the print review system 110 inspects portions of print media that have been marked by the printer. The images are stored in memory, and reviewed by controller 114. Based on a comparison of the images of the print media to target data stored in memory at the print review system 110, controller 114 is capable of detecting and/or reporting printhead conditions. Specifically, when analyzing images of printed content to detect the presence of printhead conditions, print review system 110 consults inspection parameters stored in memory. An inspection parameter comprises criteria for reviewing an image to determine that a printhead is operating abnormally at the printer. For example, an inspection parameter may indicate an amount of permitted deviation in position, color, or lightness from that which is expected based on print data. Based on the number and type of inspection parameter violations, a printhead condition may be detected and categorized into a specific type (e.g., jetout, deviated jet, or delamination) by controller 114. In one embodiment, controller 114 may detect the presence of printhead conditions in accordance with the techniques described in U.S. patent application Ser. No. 16/712,985 filed on Dec. 12, 2019, entitled "ENHANCED PRINT DEFECT DETECTION," and herein incorporated by reference.

Furthermore, when detecting the presence of a printhead condition, print review system 110 may map the location of the printhead condition (e.g., within an image) to specific a printhead and/or individual nozzle. This mapping may be based on printhead location information stored in memory, printer configuration information (e.g., the physical/electrical arrangement and interconnections of device within the printer such as printheads, nozzles, print controller, color planes and/or etc.), and/or other information.

After a series of inspections have been performed (e.g., for many print jobs and/or across many days), controller 114 generates a GUI that notifies a print shop operator of historical printhead condition frequency, and directs display 120 to present the GUI to a user. Display 120 comprises any suitable device for visually displaying digital information, and may comprise a monitor, projector, touchscreen, etc. Although display 120 is depicted as being directly coupled with print review system 110, in further embodiments display 120 may be a component of a client device, such as a mobile phone that accesses the GUI via a cloud-based application hosted on a server.

A technician may interact with the GUI via user interface 112, in order to interact with, update, or revise the contents being displayed. User interface 112 may comprise a touchscreen, keyboard, mouse, etc. as desired.

Any suitable components depicted herein may be implemented separately but communicatively coupled (e.g., as physically distinct components or devices), or may alternatively be integrated into print review system 110. For example, print review system 110 may be distinct from or integrated with a printer depending upon preference.

The particular arrangement, number, and configuration of components described herein is illustrative and non-limiting. Illustrative details of the operation of print review system 110 will be discussed with regard to FIG. 2. Assume, for this embodiment, that print review system 110 has collected information describing previously detected printhead conditions at a printer over a period of one month or more, by printing test patterns at the printer daily, and inspecting the results. The controller 114 stores historical data in memory indicating the location of each printhead condition detected, the corresponding printhead and/or nozzle for the printhead condition, and the date that the printhead condition was detected.

A technician interacts with the print review system 110, requesting a GUI showing the historical frequency of printhead conditions at each printhead of the printer across a period of time. Controller 114 consults information in memory indicating the number of printhead conditions of the type desired for review (e.g., jetouts, deviated jets, and/or delaminations), and for each printhead, sums a number of instances of each printhead condition during the period of time. In one embodiment, printhead conditions of different types are assigned different weights before being summed. This enables different types of printhead conditions to have differing amounts of visual impact on the resulting GUI.

In a further embodiment, as a part of the summing, controller 114 determines if a printhead has been replaced during the period of time being considered. If so, the controller 114 ignores all printhead conditions for that printhead detected prior to its replacement. Controller 114 may determine that a printhead has been replaced by querying the printer, determining a date in time that a serial number of the printhead was changed, etc.

Figure 2:
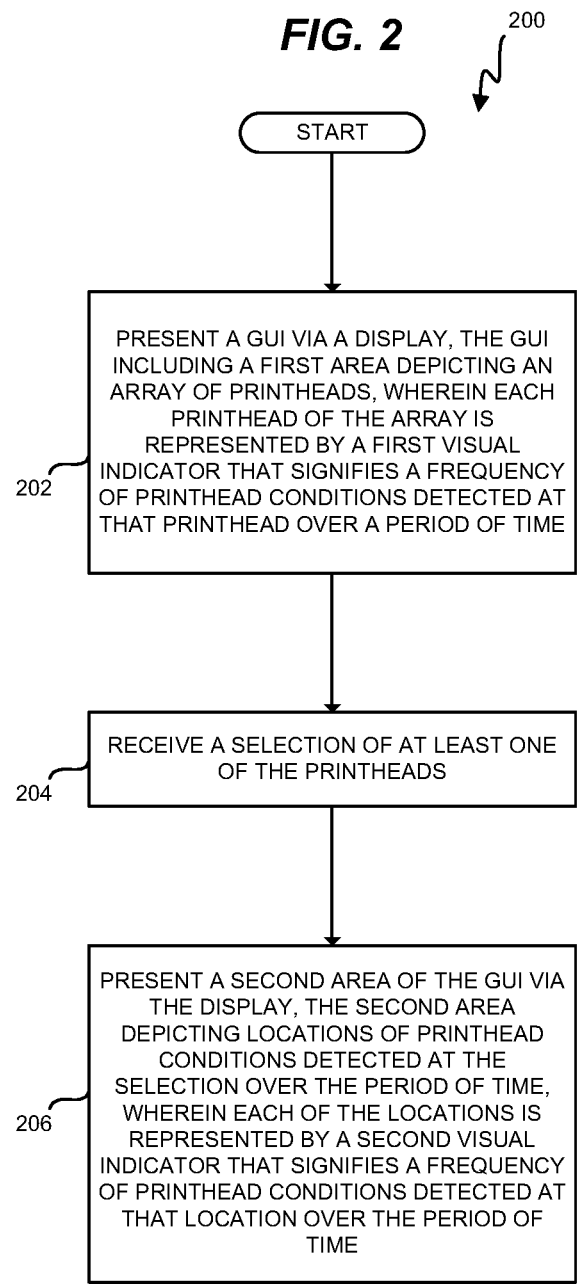
FIG. 2 is a flowchart illustrating a method for operating a print review system to report historical printhead condition frequency in an illustrative embodiment.

FIG. 2 is a flowchart illustrating a method 200 for operating a print review system to report historical printhead condition frequency in an illustrative embodiment. The steps of method 200 are described with reference to print review system 110 of FIG. 1, but those skilled in the art will appreciate that method 200 may be performed in other systems. The steps of the flowcharts described herein are not all inclusive and may include other steps not shown. The steps described herein may also be performed in an alternative order.

In step 202, controller 114 presents a GUI via the display 120. The GUI includes a first area depicting an array of printheads. Within the GUI, each printhead of the array is represented by a first visual indicator that signifies a frequency of printhead conditions detected at that printhead over the period of time. Within the GUI, the first visual indicators may be arranged in the same pattern as the printheads that they represent. Thus, a technician reviewing the GUI is presented with information in a manner that is both intuitive and informative.

The first visual indicators comprise portions of the GUI that are adjusted in prominence based on the number of printhead conditions detected for corresponding printheads. For example, a first visual indicator may comprise an icon that changes in brightness, shape, size, and/or color based on the number of printhead conditions detected for a corresponding printhead. In one embodiment, the first area is presented as a heatmap, and an intensity of each first visual indicator corresponds with a frequency of printhead conditions for a corresponding printhead. The intensity may be represented by a feature such as a color, shape, lightness/darkness, pattern, or size, to each of the first visual indicators, based on the number of detected printhead conditions for each printhead during the period of time.

In one embodiment, the intensity is a color that is determined by a formula based on a length of the period of time and the number of detected printhead conditions. For example, an intensity may be scaled for time such that an average number of printhead conditions per month corresponds with an average amount of intensity. In further embodiments, the intensity is scaled to a dynamic range between zero and the largest number of printhead conditions detected at any of the printheads.

In a further embodiment, controller 114 detects that a printhead of the array has encountered a printhead condition of a predetermined type during the period of time. The controller 114 then alters a first visual indicator for the printhead to indicate the printhead condition of the predetermined type. For example, each printhead which has encountered a jetout may be colored gray, each printhead which has encountered a deviated jet may be colored blue, and each printhead which has encountered a delamination may be colored red. Intensity may then be represented for each as a change in saturation, darkness, and/or pattern. Combinations of different categories of printhead conditions at a single printhead over the time period may be represented in a blend of corresponding colors.

In further embodiments, certain predetermined types of printhead conditions (e.g., delaminations) are considered particularly relevant. As such, in response to detecting the presence of a single instance of the predetermined type at a printhead, the controller 114 may highlight the first visual indicator for that printhead to prominently display the presence of the printhead condition.

In step 204 controller 114 receives a selection of at least one of the printheads. The selection may be provided by the technician operating a user interface (e.g., keyboard, mouse, microphone) at the print review system 110, or transmitting a message to the print review system 110. For example, the technician may click on, move their cursor over, or otherwise indicate a first visual indicator associated with a printhead.

In one embodiment, printheads at the printer are physically integrated as pairs of printheads. Thus, a selection may indicate a pair of printheads at a time instead of a single printhead. Other combinations of printheads may be selected as well, depending on the configuration of the printer being considered.

In step 206, controller 114 presents a second area of the GUI via the display 120. The second area depicts locations of printhead conditions detected at the selection over the period of time. Each of the locations is represented by a second visual indicator that signifies a frequency of printhead conditions detected at that location over the period of time.

In one embodiment, each location represents a group of nozzles (e.g., a group of ten to fifteen contiguously arranged nozzles in the same row) at a printhead. In further embodiments, each location represents a single nozzle at the printhead.

The second visual indicator for each location is assigned an intensity based on the number of detected printhead conditions at the location during the period of time. Thus, a technician viewing the second area may rapidly determine where, within the selected printhead, printhead conditions are prone to appearing. The second visual indicators, much like the first visual indicators, may be presented as a heatmap to indicate the locations that have most frequently encountered printhead conditions during the period of time.

Method 200 provides a technical benefit over prior techniques, because it compiles a vast amount of historical inspection data into a format that is intuitive, easy to explore, and straightforward to interpret. This eliminates the need for a print shop technician to manually inspect the results of individual inspections in order to compile a history of printhead conditions at each printhead, and/or locations therewithin.

Figure 3:
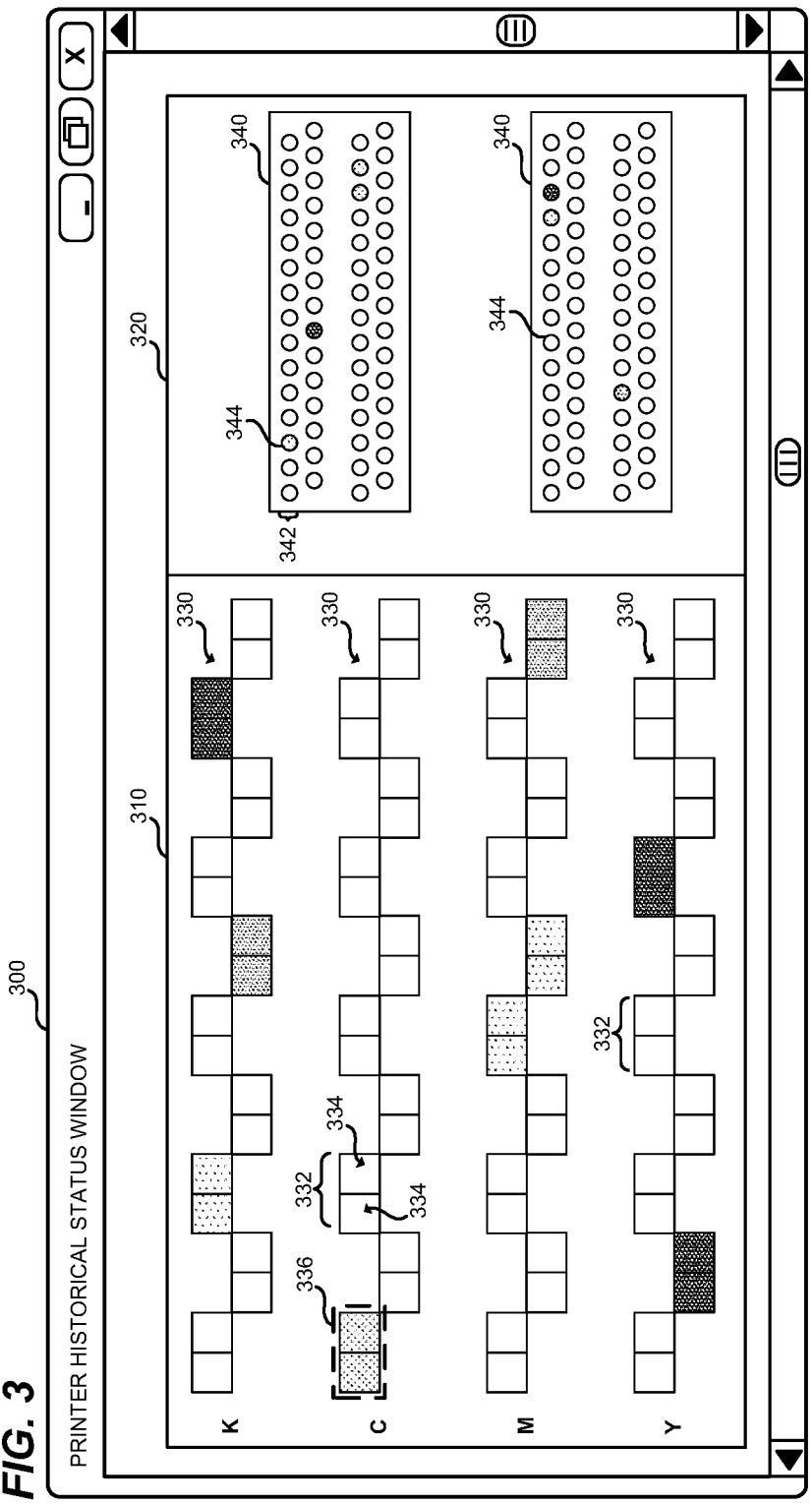
FIG. 3 depicts a GUI for reporting historical printhead condition frequency in an illustrative embodiment.

FIG. 3 depicts a GUI 300 for reporting historical printhead condition frequency in an illustrative embodiment. As shown in FIG. 3, GUI 300 includes a first area 310, which includes first visual indicators 334 (in the form of squares) that each correspond with a printhead at a printer. The first visual indicators 334 are grouped into pairs 332, and the pairs are arranged into color planes 330 for black, cyan, magenta, and yellow (K, C, M, Y). In this manner, the arrangement of first visual indicators 334 matches the arrangement of printheads at a corresponding printer.

In this embodiment, the first visual indicators 334 are altered based on a number of printhead conditions detected for corresponding printheads over a period of time. That is, the first visual indicators 334 for printheads having more printhead conditions over the period of time exhibit a greater intensity. In this example, intensity is indicated by a darkness of the first visual indicators 334. However, in further embodiments any suitable metric may be used (e.g., progression from black to red, brightness, shape, size, etc.).

In this embodiment, a user has clicked on a first visual indicator 334 in the cyan color plane, resulting in a selection 336 for a pair of printheads in the cyan color plane. To represent this selection in greater detail, the GUI 300 populates a second area 320 with second visual indicators 344, arranged in regions 340 for separate printheads. The second visual indicators 344 are altered based on a number of printhead conditions detected for corresponding locations at a printhead over a period of time. In this embodiment, each second visual indicator 344 corresponds with a location of a group of ten adjacent nozzles at the printhead which are within the same row 342. Grouping nozzles for presentation helps to reduce eye strain for a technician, as an individual printhead may include twelve hundred or more nozzles per row. Many displays are simply incapable of providing such a level of detail in a manner that is easily interpretable to a human.

Figure 4:
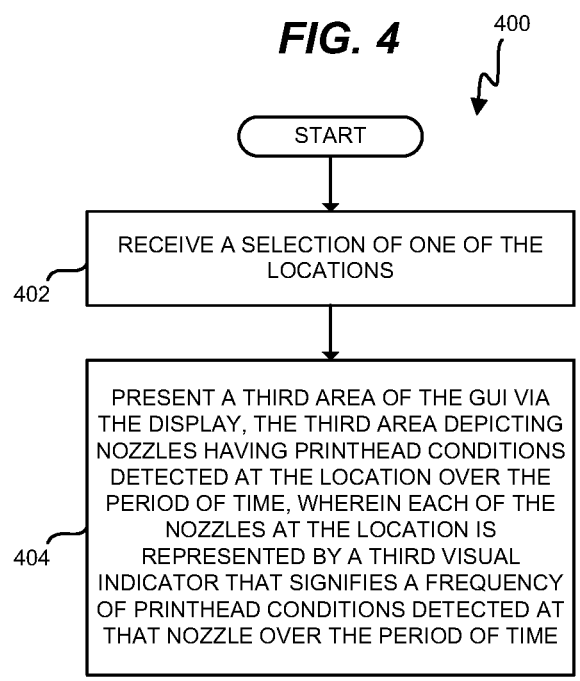
FIG. 4 is a flowchart illustrating a method for operating a print review system to report historical printhead conditions for specific nozzles in an illustrative embodiment.

FIG. 4 is a flowchart illustrating a method 400 for operating a print review system to report historical printhead conditions for specific nozzles in an illustrative embodiment. Specifically, FIG. 4 describes a method for presenting nozzle-by-nozzle historical information for a location at a printhead.

Method 400 includes receiving a selection of a location in a second area 320 of a GUI 300 in step 402. The selection may be determined by a user clicking on, moving a cursor over, or otherwise interacting with a second visual indicator 344 corresponding with the location. Controller 114 then determines a location corresponding with the second visual indicator 344.

In step 404, the controller 114 presents a third area of the GUI 300 via the display 120. The third area depicts nozzles having printhead conditions detected at the location over the period of time. Each of the nozzles at the location is represented by a third visual indicator 510. The third visual indicators 510 each signify a frequency of printhead conditions detected at a specific nozzle over the period of time being currently contemplated.

Method 400, by providing a third level of detail at the GUI 300, results in a technical benefit by enabling a technician to rapidly consider potential reliability concerns at a printer, at a variety of levels of granularity/zoom. This reduces the amount of time spent by a technician swapping between GUIs and/or historical inspection reports, which allows more time to be spent by the technician on other tasks.

Figure 5:
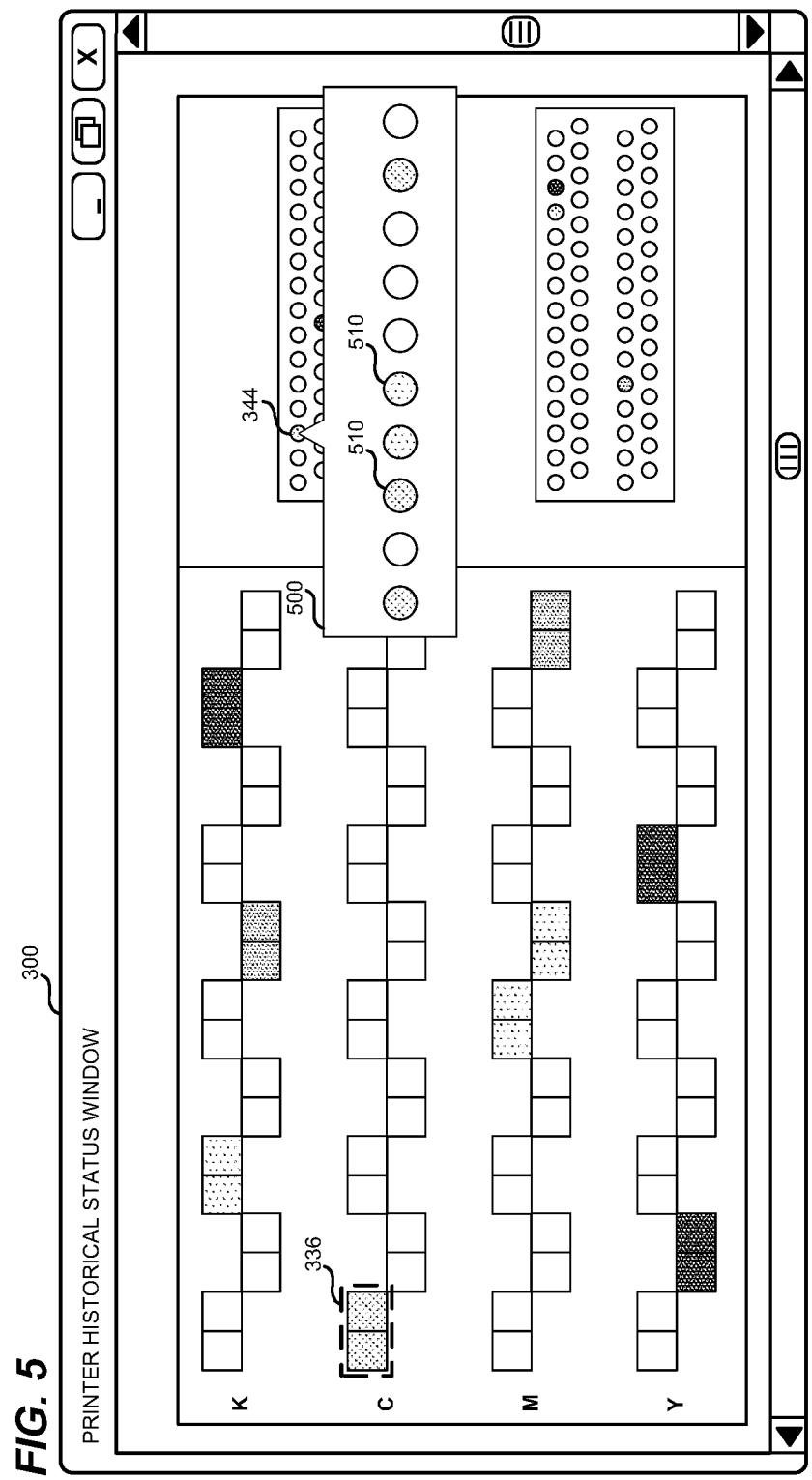
FIG. 5 depicts a GUI for reporting historical printhead condition frequency for specific nozzles in an illustrative embodiment.

FIG. 5 depicts the GUI 300 of FIG. 3 for reporting historical printhead condition frequency in an illustrative embodiment, being updated in accordance with the method 400 of FIG. 4. In FIG. 5, a technician has moved a cursor over, clicked, on, or otherwise selected a second visual indicator 344. This causes the controller 114 of the print review system 110 to generate a third area 500 having third visual indicators 510. Each of the third visual indicators 510 represents an individual nozzle at the printhead. Furthermore, an intensity of each of the third visual indicators is based on a frequency of detected printhead conditions for each of the nozzles. The thresholds for determining the intensity for a printhead (e.g., hundreds of nozzles) the intensity for a location on a printhead (e.g., ten to fifteen nozzles), and/or the intensity for a single nozzle may vary depending on the number of nozzles within the group, as well as the period of time selected.

Figure 6:
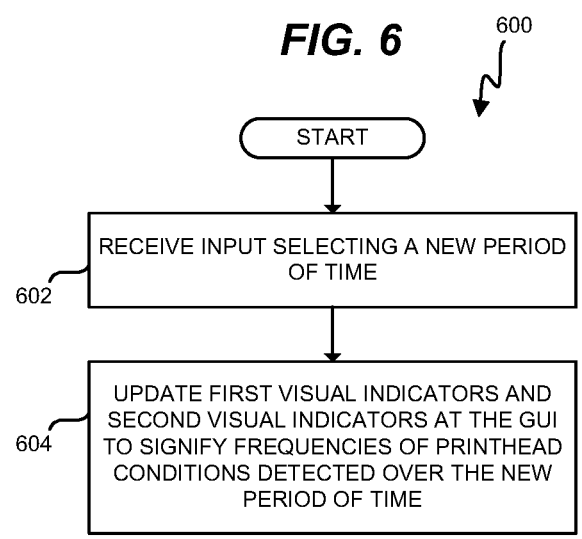
FIG. 6 is a flowchart illustrating a method for adjusting time periods for reports of historical printhead conditions in an illustrative embodiment.

FIG. 6 is a flowchart illustrating a method 600 for adjusting time periods for reports of historical printhead conditions in an illustrative embodiment. Step 602 comprises receiving input selecting a new period of time. The input may indicate an amount of time before the present (e.g., the prior month, prior three months, etc.), or may indicate a specific range of time (e.g., between November $1^{st}$ and December $1^{st}$ of the prior year).

Step 604 comprises updating first visual indicators 334 and second visual indicators 344 at the GUI to signify frequencies of printhead conditions detected over the new period of time. Controller 114 may perform this operation by filtering out printhead conditions that are not in the new period of time, and then updating intensities of visual indicators based on the frequencies for the new period of time for corresponding printheads, locations, and/or nozzles.

Method 600 provides a technical benefit over prior techniques because it allows a technician to rapidly adjust the period of time being illustrated via heatmap. This enhances productivity by enabling heatmaps to be rapidly tailored to time periods of interest.

Figure 7:
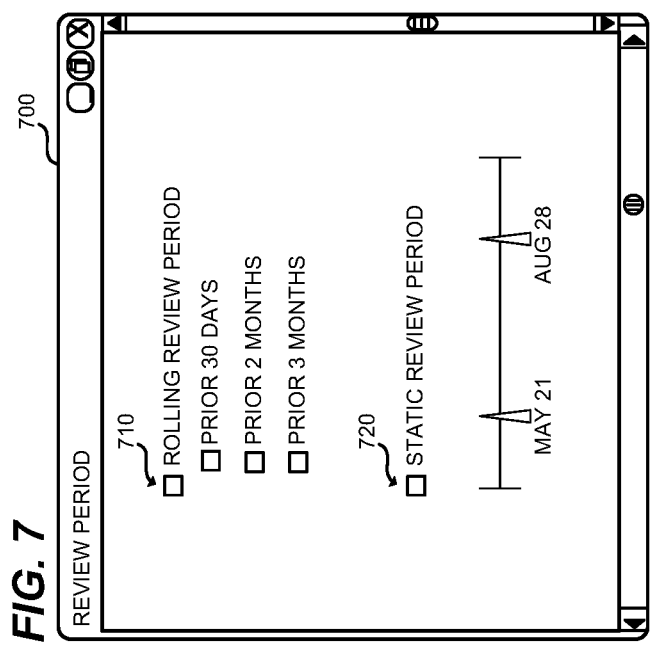
FIG. 7 depicts a GUI that adjusts a period of time used for reporting historical printhead conditions in an illustrative embodiment.

FIG. 7 depicts a GUI 700 that adjusts a period of time used for reporting historical printhead conditions in an illustrative embodiment, in accordance with method 600. GUI 700 includes two separate options for selecting a period of time to review. The first option is a rolling review period, which is selectable by clicking on element 710. A rolling review period is an amount of time measured backwards from the current day. A technician may further select a desired amount of time for the rolling period, such as thirty days, two months, three months, etc.

The second option is a static review period, which is selectable by clicking on element 720. A static review period is an amount of time between two specifically selected dates. By adjusting sliders, or manually entering dates, a technician may select boundaries of the static review period that are most relevant to the current circumstances.

Figure 8:
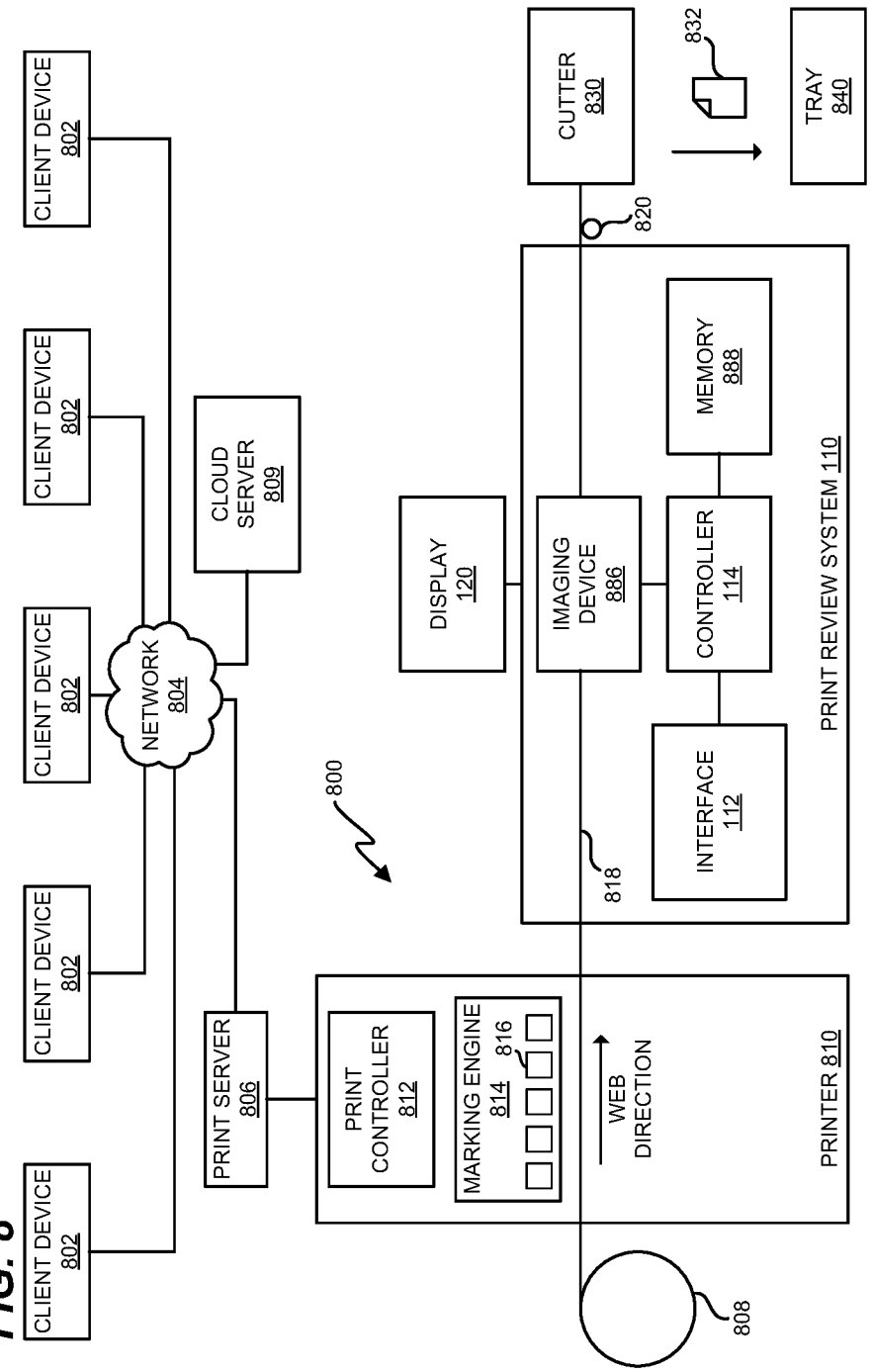
FIG. 8 is a block diagram of a print review system operating within a print shop in an illustrative embodiment.
Figure 9:
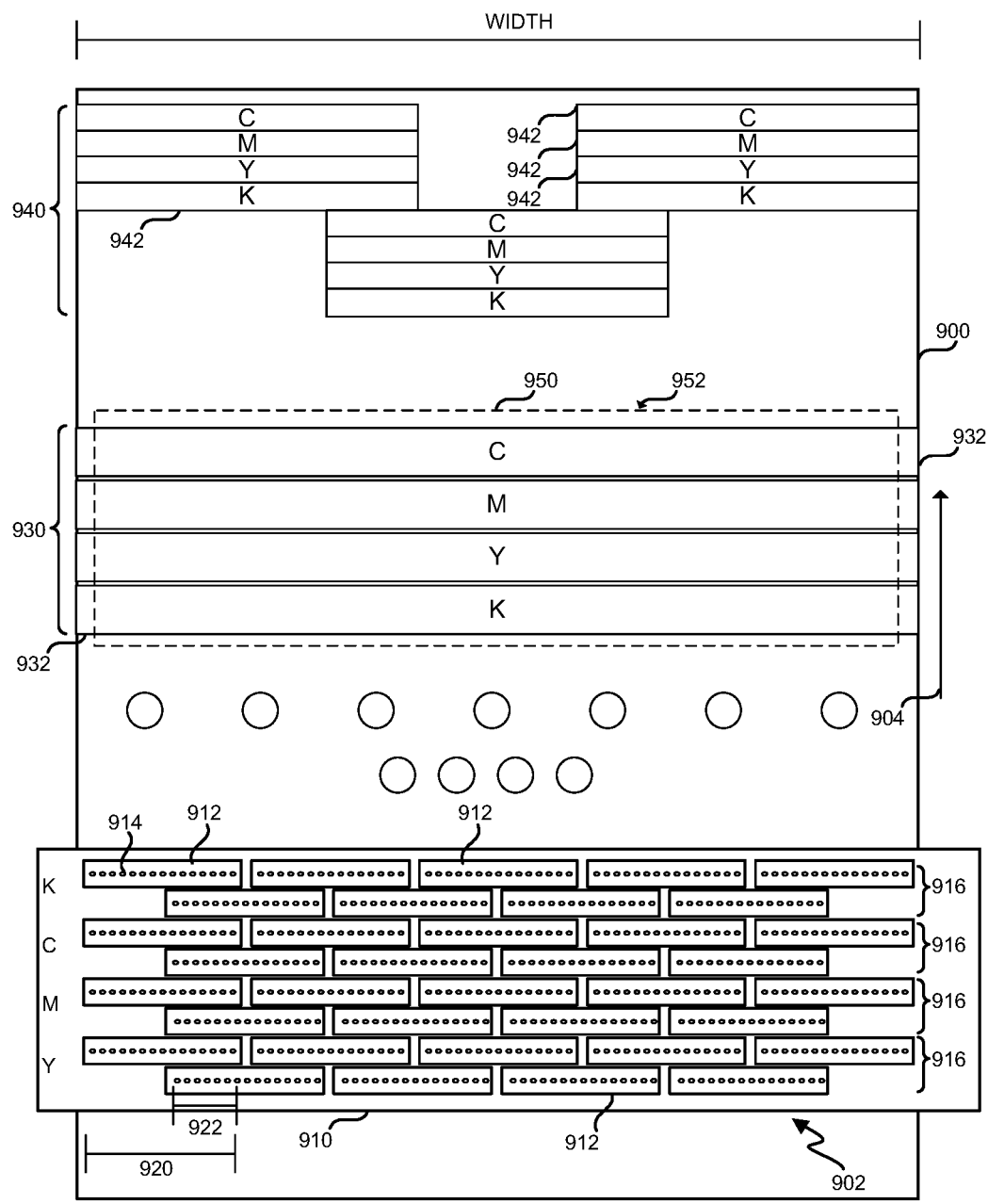
FIG. 9 depicts a page being marked by a marking engine in an illustrative embodiment.

With an understanding of GUIs for historical information provided above, FIGS. 8-9 further illustrate operating environments that such GUIs may be implemented in. Specifically, FIG. 8 depicts a print shop that may beneficially utilize GUIs, while FIG. 9 depicts a page that has received test patterns used to detect printhead conditions reported in GUIs.

FIG. 8 is a block diagram of a print review system 110 operating within a print shop 800 in an illustrative embodiment. According to FIG. 8, a print server 806 at the print shop 800 receives print jobs from one or more client devices 802 (e.g., via a network 804 such as the Internet). The print server 806 schedules the print jobs for printing at one or more printers 810. To initiate printing of an individual print job, print server 806 transmits the print job to a printer 810. A print controller 812 at the printer 810 processes (e.g., rasterizes) the print data for the job in accordance with a job ticket for the print job, and generates instructions for a marking engine 814 at the printer 810. The marking engine 814 receives a web 818 of print media from an unwinder 808, and marks the web 818 using printheads 816 which apply ink or another marking material (e.g., fluids, liquids, powders, etc. that are suitable for printing) to the web 818.

Portions of the web 818 that have been marked advance downstream in a web direction to print review system 110. These portions of the web 818 pass by imaging device 886. Imaging device 886 comprises any suitable device for capturing optical data (e.g., optical scanner, camera, densitometer, etc.). Imaging device 886 may periodically or continuously acquire images of the print media via a single camera or an array of cameras in real-time as the printer 810 continues marking upon the web 818. In embodiments where an array of cameras is used, the imaging device 886 may stitch images from cameras in the array together, in order to generate a composite image that extends across a width of the web 818 (i.e., a direction perpendicular to a process direction of the web of print media).

In one embodiment, the imaging device 886 selectively determines when to acquire images. For example, an image may be acquired each time an instance of a flush line or flush page, periodically printed by the printer 810 onto the web 818 (e.g., every page, every ten pages, every one hundred pages, etc.), passes across the view of the imaging device 886. In one embodiment, the printer 810 is capable of printing at a higher number of Dots Per Inch (DPI) than the imaging device 886 can resolve (e.g., twelve hundred DPI as printed, as compared to six hundred DPI as scanned). In such an embodiment, a flush line or flush page may be split and printed into physically distinct sections, wherein each section utilizes a different combination of nozzles to print at the DPI rate supported by the imaging device 886, enabling accurate review and analysis. In a further embodiment, the resolution of images acquired by the imaging device is chosen such that each pixel in the image corresponds with a size equal to or less than that of a droplet of ink applied by a nozzle at a printhead. The images acquired by the imaging device are stored in a memory (not shown), and are analyzed by a controller 114.

In this example, portions of the web 818 that have been imaged advance to a cutter 830, via roller 820. The cutter 830 cuts the portions into sheets 832 for stacking into a tray 840. In another embodiment, the portions of the web 818 exit the print review system 110 and advance towards a rewinder device that replaces cutter 830 (e.g., a roll-to-roll configuration), or are processed by any suitable form of post-print processing machinery and/or devices.

Images acquired via imaging device 886 are accessed by controller 114, which reviews the images in accordance with inspection parameters, in order to detect printhead conditions. Printhead conditions detected during inspection may then be stored by controller 114 in memory 888 for later reference when generating heatmaps of historical conditions.

In this embodiment, controller 114 is coupled for communication with print controller 812 of printer 810, network 804 and/or print server 806. Controller 114 combines the results of historical inspections of the printer 810 made over time, for presentation at a GUI via display 120 and/or print server 806. Controller 114 also pushes data for the GUI to cloud server 809, which may provide the GUI to one or more client devices 802 via a cloud-based web application storing GUI data. In this manner, a field technician or customer can view the historical status of a printer 810, and diagnose printer health, remotely from a client device 802 without needing physical access to the printer or print review system 110.

FIG. 9 depicts a page 900 being marked by a marking engine 902 in an illustrative embodiment. The marking engine 902 applies flush lines 930 and 940 to the page 900 of print media as the page 900 advances in a process direction 904. In this embodiment, flush lines 930 and 940 include bands 932 and 942 for color planes of Cyan (C), Magenta (M), Yellow (Y), and Key Black (K). At the marking engine 902, one or more arrays 910 of printheads 912 for color planes 916 operate nozzles 914 to eject ink or another marking material onto page 900 of print media. Printheads 912 and/or nozzle 914 may be assigned to color planes/channels (e.g., cyan, magenta, yellow, key black, protector coating, clear, etc.) to eject corresponding marking materials (e.g., cyan, magenta, yellow, key black, protector coating, clear, etc.).

In this embodiment, the printheads 912 occupy regions 920 along a width of the page 900. That is, each region 920 represents a portion of the width of the page 900 that is occupied by a specific printhead 912. In one embodiment, the regions 920 comprise locations 922, which each correspond with a grouping of ten to fifteen (or more) nozzles 914, however, this number may vary depending on the DPI of the printer and/or the imaging device being used for inspection.

The flush lines depicted in FIG. 9 may facilitate the detection of jetouts, deviated jets, and/or other printhead conditions, and may be printed regularly at the start of each day, each print job, after every page, after a predefined linear distance along a print job, etc. FIG. 9 also depicts an analysis region 950, which corresponds with a portion of an image of the page 900 that will be analyzed by a print review system 110. The boundaries 952 of the analysis region 950 may be adjusted based on settings of a corresponding printer for the current print job.

Examples

In the following examples, additional processes, systems, and methods are described. The following clauses and/or examples pertain to further embodiments or examples. Specifics in the examples may be used anywhere in one or more embodiments. The various features of the different embodiments or examples may be variously combined with some features included and others excluded to suit a variety of different applications. Examples may include subject matter such as a method, means for performing acts of the method, at least one machine-readable medium including instructions that, when performed by a machine cause the machine to perform acts of the method, or of an apparatus or system according to embodiments and examples described herein.

Figure 10:
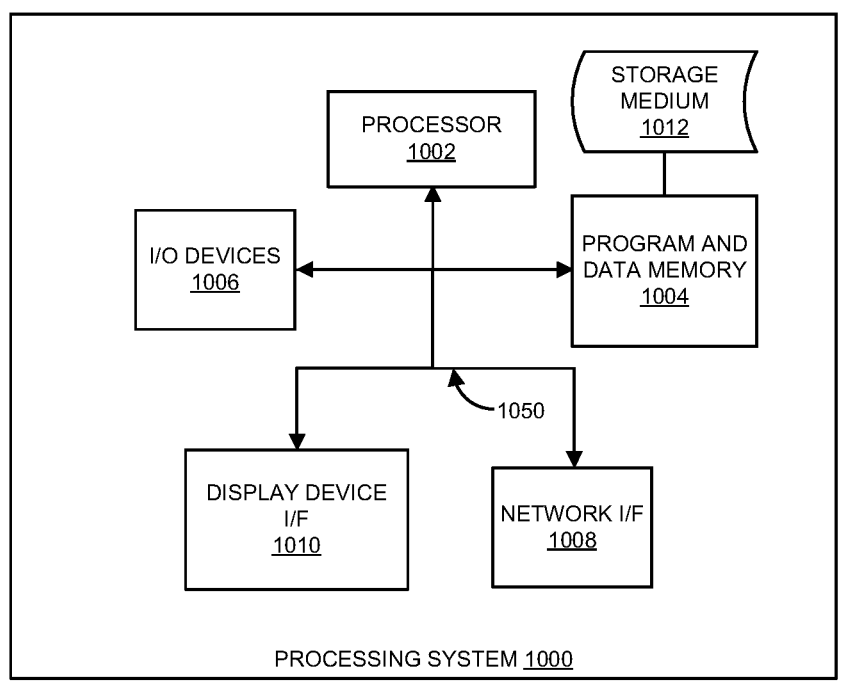
FIG. 10 illustrates a processing system operable to execute a computer readable medium embodying programmed instructions to perform desired functions in an illustrative embodiment.

Embodiments disclosed herein can take the form of software, hardware, firmware, or various combinations thereof. In one particular embodiment, software is used to direct a processing system of print review system 110 to perform the various operations disclosed herein. FIG. 10 illustrates a processing system 1000 operable to execute a computer readable medium embodying programmed instructions to perform desired functions in an illustrative embodiment. Processing system 1000 is operable to perform the above operations by executing programmed instructions tangibly embodied on computer readable storage medium 1012. In this regard, embodiments of the invention can take the form of a computer program accessible via computer-readable medium 1012 providing program code for use by a computer or any other instruction execution system. For the purposes of this description, computer readable storage medium 1012 can be anything that can contain or store the program for use by the computer.

Computer readable storage medium 1012 can be an electronic, magnetic, optical, electromagnetic, infrared, or semiconductor device. Examples of computer readable storage medium 1012 include a solid state memory, a magnetic tape, a removable computer diskette, a random access memory (RAM), a read-only memory (ROM), a rigid magnetic disk, and an optical disk. Current examples of optical disks include compact disk-read only memory (CD-ROM), compact disk-read/write (CD-R/W), and DVD.

Processing system 1000, being suitable for storing and/or executing the program code, includes at least one processor 1002 coupled to program and data memory 1004 through a system bus 1050. Program and data memory 1004 can include local memory employed during actual execution of the program code, bulk storage, and cache memories that provide temporary storage of at least some program code and/or data in order to reduce the number of times the code and/or data are retrieved from bulk storage during execution.

Input/output or I/O devices 1006 (including but not limited to keyboards, displays, pointing devices, etc.) can be coupled either directly or through intervening I/O controllers. Network adapter interfaces 1008 may also be integrated with the system to enable processing system 1000 to become coupled to other data processing systems or storage devices through intervening private or public networks. Modems, cable modems, IBM Channel attachments, SCSI, Fibre Channel, and Ethernet cards are just a few of the currently available types of network or host interface adapters. Display device interface 1010 may be integrated with the system to interface to one or more display devices, such as printing systems and screens for presentation of data generated by processor 1002.

Although specific embodiments were described herein, the scope of the invention is not limited to those specific embodiments. The scope of the invention is defined by the following claims and any equivalents thereof.

What is claimed is:

1. A system comprising:
   a user interface;
   a display; and
   a controller configured to present a Graphical User Interface (GUI) via the display, the GUI including a first area depicting an array of printheads, wherein each printhead of the array of printheads is represented by a first visual indicator that signifies a frequency of printhead conditions detected over a period of time at a corresponding printhead of the array of printheads, and wherein each first visual indicator representing each printhead of the array of printheads comprises a graphical icon,
   wherein in response to receiving a selection of at least one of the array of printheads via the user interface to identify a selected printhead, the controller is further configured to present a second area of the GUI via the display, the second area graphically depicting physical locations of printhead conditions detected over the period of time at the selected printhead,
   wherein each of the physical locations of printhead conditions detected is represented by a second visual indicator that signifies a frequency of printhead conditions detected over the period of time at the physical locations of the selected printhead, wherein the second visual indicator comprises a graphical icon representing a physical location of a corresponding group of nozzles on the selected printhead.

2. The system of claim 1 wherein:
   the controller is further configured, in response to receiving a selection of one of the physical locations of printhead conditions detected via the user interface identifying a selected group of nozzles, to
   present a third area of the GUI via the display, the third area depicting nozzles having printhead conditions detected over the period of time at the selected group of nozzles,
   wherein each of the nozzles in the selected group of nozzles is represented by a third visual indicator that signifies a frequency of printhead conditions detected over the period of time at the nozzle.

3. The system of claim 1 wherein:
   in response to receiving input selecting a new period of time via the user interface, the controller is further configured to
   update first visual indicators and second visual indicators at the GUI to signify frequencies of printhead conditions detected over the new period of time.

4. The system of claim 1 wherein:
   the first area depicts the array of printheads as a heatmap,
   wherein an intensity of each first visual indicator corresponds with a frequency of printhead conditions for a corresponding printhead.

5. The system of claim 4 wherein:
   the intensity is depicted via varying at least one of: a color of the icon, a darkness of the icon, a size of the icon, a shape of the icon, and a pattern of the icon.

6. The system of claim 1 wherein:
   the controller is further configured to
   detect that a printhead of the array has encountered a printhead condition of a predetermined type during the period of time, and
   alter a first visual indicator for the printhead to indicate the printhead condition of the predetermined type.

7. The system of claim 6 wherein:
   the controller is further configured to
   alter the first visual indicator by selecting a color associated with the predetermined type, and
   change a color of the first visual indicator to the color.

8. A method comprising:
   presenting a Graphical User Interface (GUI) via a display, the GUI including a first area depicting an array of printheads, wherein each printhead of the array of printheads is represented by a first visual indicator that signifies a frequency of printhead conditions detected over a period of time at a corresponding printhead of the array of printheads, wherein each first visual indicator representing each printhead of the array of printheads comprises a graphical icon;
   receiving a selection of at least one of the array of printheads to identify a selected printhead; and
   in response to receiving a selection of at least one of the array of printheads, presenting a second area of the GUI via the display, the second area graphically depicting physical locations of printhead conditions detected over the period of time at the selected printhead,
   wherein each of the physical locations of printhead conditions detected is represented by a second visual indicator that signifies a frequency of printhead conditions detected over the period of time at the physical locations of the selected printhead, and wherein the second visual indicator comprises a graphical icon representing a physical location of a corresponding group of nozzles on the selected printhead.

9. The method of claim 8 wherein:

the method further comprises:

receiving a selection of one of the physical locations of printhead conditions detected identifying a selected group of nozzles; and presenting a third area of the GUI via the display, the third area depicting nozzles having printhead conditions detected over the period of time at the selected group of nozzles, wherein each of the nozzles in the selected group of nozzles is represented by a third visual indicator that signifies a frequency of printhead conditions detected over the period of time at the nozzle.

10. The method of claim 8 further comprising:

receiving input selecting a new period of time; and updating first visual indicators and second visual indicators at the GUI to signify frequencies of printhead conditions detected over the new period of time.

11. The method of claim 8 wherein:

the first area depicts the array of printheads as a heatmap, wherein an intensity of each first visual indicator corresponds with a frequency of printhead conditions for a corresponding printhead.

12. The method of claim 11 wherein:

the intensity is depicted via varying at least one of: a color of the icon, a darkness of the icon, a size of the icon, a shape of the icon, and a pattern of the icon.

13. The method of claim 8 further comprising:

detecting that a printhead of the array has encountered a printhead condition of a predetermined type during the period of time; and altering a first visual indicator for the printhead to indicate the printhead condition of the predetermined type.

14. The method of claim 13 further comprising:

altering the first visual indicator by selecting a color associated with the predetermined type; and changing the first visual indicator to the color.

15. A non-transitory computer readable medium embodying programmed instructions which, when executed by a processor, are operable for performing a method comprising:

presenting a Graphical User Interface (GUI) via a display, the GUI including a first area depicting an array of printheads, wherein each printhead of the array of printheads is represented by a first visual indicator that signifies a frequency of printhead conditions detected over a period of time at a corresponding printhead of the array of printheads, wherein the first visual indicator representing each printhead of the array of printheads comprises a graphical icon;

receiving a selection of at least one of the array of printheads to identify a selected printhead; and in response to receiving a selection of at least one of the array of printheads, presenting a second area of the GUI via the display, the second area graphically depicting physical locations of printhead conditions detected over the period of time at the selected printhead, wherein each of the physical locations of printhead conditions detected is represented by a second visual indicator that signifies a frequency of printhead conditions detected over the period of time at the physical locations of the selected printhead, wherein the second visual indicator comprises a graphical icon, and wherein each of the locations of printhead conditions is graphically depicted as a graphical icon representing a physical location of a corresponding group of nozzles on the selected printhead.

16. The non-transitory computer readable medium of claim 15 wherein:

the method further comprises:

receiving a selection of one of the physical locations of printhead conditions detected identifying a selected group of nozzles; and presenting a third area of the GUI via the display, the third area depicting nozzles having printhead conditions detected over the period of time at the selected group of nozzles, wherein each of the nozzles in the selected group of nozzles is represented by a third visual indicator that signifies a frequency of printhead conditions detected over the period of time at the nozzle.

17. The non-transitory computer readable medium of claim 15 wherein the instructions are further operable for:

receiving input selecting a new period of time; and updating first visual indicators and second visual indicators at the GUI to signify frequencies of printhead conditions detected over the new period of time.

18. The non-transitory computer readable medium of claim 15 wherein:

the first area depicts the array of printheads as a heatmap, wherein an intensity of each first visual indicator corresponds with a frequency of printhead conditions for a corresponding printhead.

19. The non-transitory computer readable medium of claim 18 wherein:

the intensity is depicted via varying at least one of: a color of the icon, a darkness of the icon, a size of the icon, a shape of the icon, and a pattern of the icon.

20. The non-transitory computer readable medium of claim 15 wherein the instructions are further operable for:

detecting that a printhead of the array has encountered a printhead condition of a predetermined type during the period of time; and altering a first visual indicator for the printhead to indicate the printhead condition of the predetermined type.

* * * * *